UNITED STATES PATENT OFFICE.

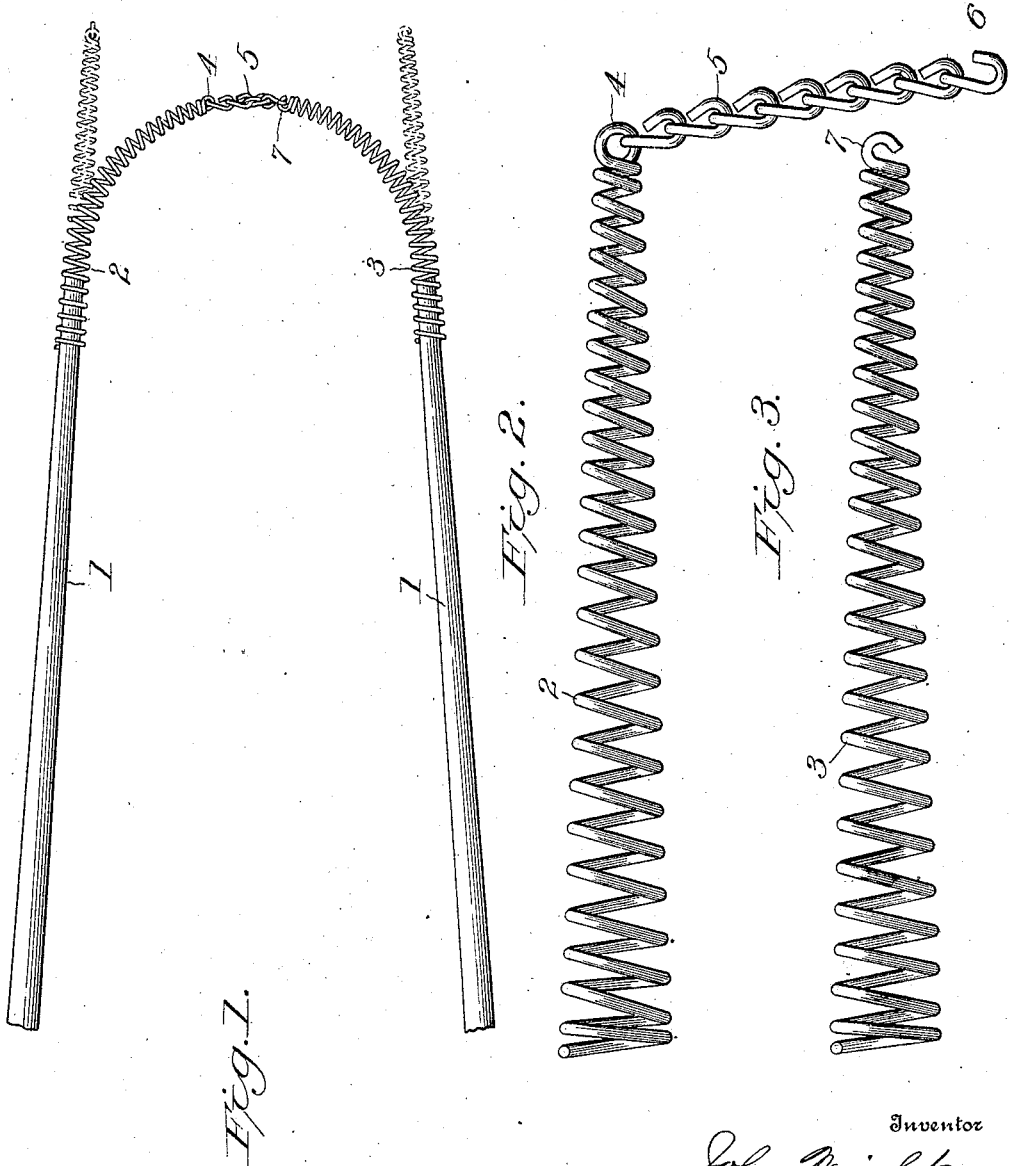

JOHN WRIGHT, OF CHICAGO, ILLINOIS, ASSIGNOR TO PETER S. WASHER, OF LITCHFIELD, ILLINOIS.

THILL-GUARD.

No. 847,302.  Specification of Letters Patent.  Patented March 12, 1907.

Application filed November 26, 1906. Serial No. 345,192.

*To all whom it may concern:*

Be it known that I, JOHN WRIGHT, a citizen of the United States, residing at Chicago, in the county of Cook and State of Illinois, have invented a certain new and useful Improvement in Thill-Guards, of which the following is a full, clear, and exact description.

The object of this invention is to provide a convenient and efficient attachment for the ends of vehicle thills or shafts to prevent them from damaging blankets and also to prevent them from becoming entangled with the reins or other portions of the harness and to otherwise preserve them from damage by or to the horse when hitched up and likewise damage by or to surrounding objects.

The invention consists of stiff spring-wire coils in helical form adapted to be frictionally engaged with the ends or tips of the shafts or thills and to be coupled together in front of the horse, so as to conceal the ends or tips of the said thills or shafts, and to connect them in such way that a blanket thrown over the horse cannot possibly be engaged with or torn by the thills and these thill ends or tips cannot do damage to or be damaged by a horse hitched up between them or be damaged by or do damage to surrounding objects, all as I will proceed now more particularly to set forth and finally claim.

In the accompanying drawings, illustrating the invention, in the several figures of which like parts are similarly designated, Figure 1 is a plan view of portions of the thills or shafts of a vehicle, showing by full lines my thill-guard in position when in use and showing said thill-guard by dotted lines in position when not in use. Fig. 2 is a plan view of one of the pair of thill-guards, and Fig. 3 is a plan view of the other of the pair of thill-guards.

The thills or shafts 1 may be of any usual construction.

My guard consists of two similar coils of heavy spring-wire 2 and 3, coiled in helical form, the guard 2 terminating in an eye 4, to which is attached a chain 5, having, preferably, a hook 6 at its end. The guard 3 terminates in a hook 7.

The guards are used by turning them on the ends of the thills or shafts, the coils acting as a sort of screw-thread to advance them firmly upon the thills, the flexibility of the coils increasing the tractive engagement of the guards on the thills or shafts. These guards are turned up on the thills sufficiently far to gain a firm grip upon them, so that they may not be easily pulled off and so as to leave a projection of from one-half to two-thirds, more or less, free of the thills. When the horse is hitched up, these projecting ends of the coils are bent or flexed laterally toward each other, as shown by full lines in Fig. 1, in front of the horse and connected in an adjustable way by engaging the chain 5 with the hook 7. Any link of the chain may be engaged with the hook 7, or, if necessary, the hook 6 of the chain may be engaged with the hook 7 of guard 3.

By the construction described the ends of the thills or shafts are completely concealed and covered up, so as to be removed from liability to punch holes through or tear the blanket thrown over a horse. Furthermore, these guards prevent the reins or other parts of the harness from slipping down beneath and becoming entangled with the ends of the shafts or thills. Again, by protecting the ends of the shafts or thills with these guards, as described, such ends no longer become a menace to the animal hitched up between the shafts or thills or to other and outside objects.

What I claim is—

1. A thill-guard, comprising a pair of wire coils adapted to be frictionally engaged with the ends of the thills, and means to connect the ends of said coils in front of the thills.

2. A thill-guard, comprising a wire coil having a chain at one end, and a similar wire coil with a hook at one end, said coils adapted to be applied to the ends of the thills and their chain and hook ends respectively engaged in front of the thills.

3. A thill-guard, composed of a pair of spring-wire coils of helical form, adapted to be engaged with the ends of vehicle shafts or thills and to have their ends connected in front of the thills and across the front of an animal hitched between said thills.

4. A thill-guard, composed of a pair of laterally-flexible coils of wire, adapted to engage the ends of thills or shafts, and means to connect their ends.

5. A thill-guard, composed of a pair of laterally-flexible coils of wire, adapted to be applied to the ends of thills or shafts, and adjustable means to connect the ends of the coils at pleasure.

In testimony whereof I have hereunto set my hand this 24th day of November, A. D. 1906.

JOHN WRIGHT.

Witnesses:
   PETER WASHER,
   A. EMRICK.